(12) United States Patent
Sato et al.

(10) Patent No.: US 6,587,220 B1
(45) Date of Patent: Jul. 1, 2003

(54) IMAGE RECORDING APPARATUS PROVIDED WITH AN ORIGINAL READING APPARATUS

(75) Inventors: Shunji Sato, Sapporo (JP); Satoshi Choho, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/311,898

(22) Filed: May 14, 1999

(30) Foreign Application Priority Data

May 20, 1998 (JP) .......................................... 10-138980

(51) Int. Cl.[7] .............................................. G06F 15/00
(52) U.S. Cl. .......................... 358/1.16; 358/296; 347/3; 399/124; 399/107
(58) Field of Search ................................ 358/1.16, 296, 358/496, 498, 502, 494; 347/3, 104; 399/124, 107, 21

(56) References Cited

U.S. PATENT DOCUMENTS 5,517,295 A * 5/1996 Kaneko et al. ............ 399/373
5,734,482 A * 3/1998 Miyamoto et al. .......... 358/444
5,901,278 A * 5/1999 Kurihara et al. ........... 358/1.15
6,041,165 A * 3/2000 Morikawa ................. 358/1.2

* cited by examiner

Primary Examiner—Mark Wallerson
Assistant Examiner—Twyler Lamb
(74) Attorney, Agent, or Firm—Fitzpatrick, Cella, Harper & Scinto

(57) ABSTRACT

An image recording apparatus provided with: a stacking tray for stacking originals thereon; a feeding device for feeding the originals on the stacking tray one by one; a reading device for reading the information of the originals fed by the feeding device; a storing device for storing the read information thereon; an image forming device for forming an image on a sheet based on the read information; and a control device for effecting a control of reading and storing a plurality of originals corresponding to the storage capacity of the storing device, and forming an image on the sheet based on the storage of the storing device, and effecting a control of forming an image on a sheet each time the image of a remaining original is read by the reading device.

10 Claims, 11 Drawing Sheets

IMAGE RECORDING APPARATUS PROVIDED WITH AN ORIGINAL READING APPARATUS

BACKGROUND OF THE INVENTION

1. Field of the Invention

This invention relates to an image recording apparatus designed to read an original sent from an original stacking tray, and once store image information in image information storing means, and then record the image.

2. Related Background Art

A digital copying apparatus as a conventional image recording apparatus reads an original placed on a platen glass by image reading means, and stores image information read by this image reading means in an image memory and prints it out, and the original is designed to be conveyed only once from an automatic original feeding device (hereinafter referred to as the "RDF") onto the platen glass.

However, the image memory provided in the digital copying apparatus is limited in its memory capacity, and when the number of originals to be read is great and image information cannot be contained in the image memory, there has been the problem that a long time is required for printing out because the reading of an image is designed to be effected after an original is conveyed from the RDF each time the image is recorded, and is placed on the platen glass.

SUMMARY OF THE INVENTION

The present invention has been made in order to solve the problem as noted above and the object thereof is to provide an image recording apparatus designed to be capable of shortening a print-out time even when image information having read all originals cannot be contained in image information storing means.

To achieve the above object, an image recording apparatus according to the present invention is provided with:

stacking means for stacking originals thereon; feeding means for feeding the originals on the stacking means one by one;

reading means for reading the information of the originals fed by the feeding means;

storing means for storing the read information therein;

image forming means for forming an image on a sheet based on the read information; and control means for effecting the control of reading and storing a plurality of originals corresponding to a storage capacity of the storing means, and forming images on sheets based on the storage, and the control of forming an image on a sheet each time the image of a remaining original is read by the reading means.

The control means controls so as to feed and read the lowermost one of the originals stacked on the original stacking means, and store the image information in the storing means when the storage capacity is not full, and then cause discharging means to discharge the read original, and also controls so as to once convey unprocessed originals to the reading means and count the number of the unprocessed originals when the storage capacity of the storing means becomes full and the storage of the image information read by the reading means is impossible, thereafter discharge the unprocessed original to the stacking means, effect the recording of the image information stored in the storing means, and further read the unprocessed originals on said original stacking means in the reading means and record images one by one.

On the basis of the above-described construction, the image recording apparatus conveys the originals stacked on the stacking means and reads them in the reading means. It then discharges the read originals to the discharging means. In this case, when the storage capacity of the storing means is full and the image information having read all originals cannot be stored in the storing means, the recording of the image information stored in the storing means is effected, whereafter the originals stacked on the stacking means are read by the reading means, and the images thereof are recorded.

As described above, according to the present invention, the image recording apparatus is controlled so as to effect the recording of the image information stored in the storing means when the originals stacked on the stacking means are conveyed and the originals read by the reading means are to be discharged to the discharging means, and when the storage capacity of the storing means is full and all image information cannot be stored in the storing means, thereafter read the originals stacked on the stacking means by the reading means and record the images thereof and therefore, even when all the image information cannot be contained in the storing means, the print-out time can be shortened.

DESCRIPTION OF THE PREFERRED EMBODIMENTS

The present invention will hereinafter be described in detail with reference to the drawings.

Figure 1:
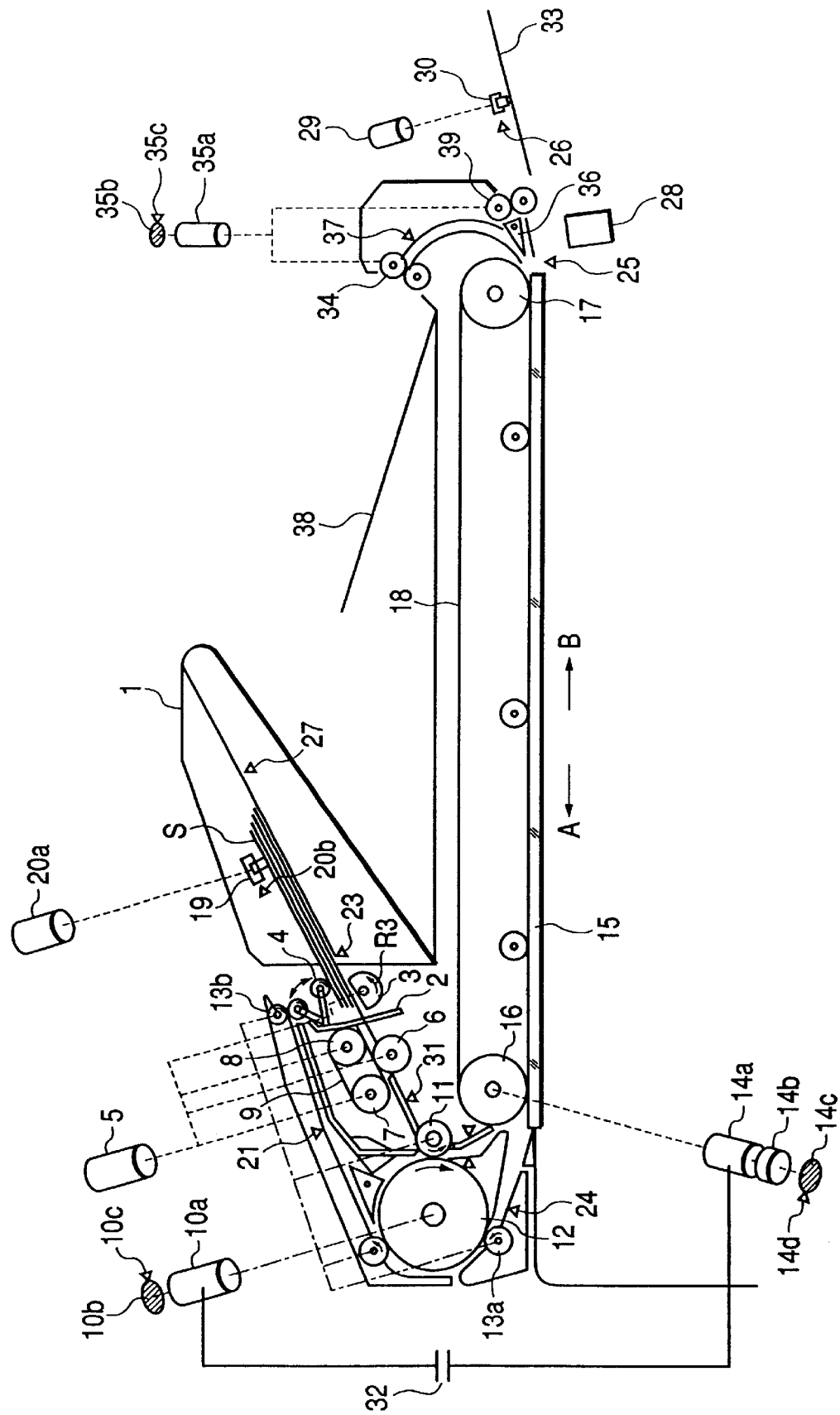
FIG. 1 schematically shows a construction of an automatic original feeding apparatus of the present invention.
Figure 2:
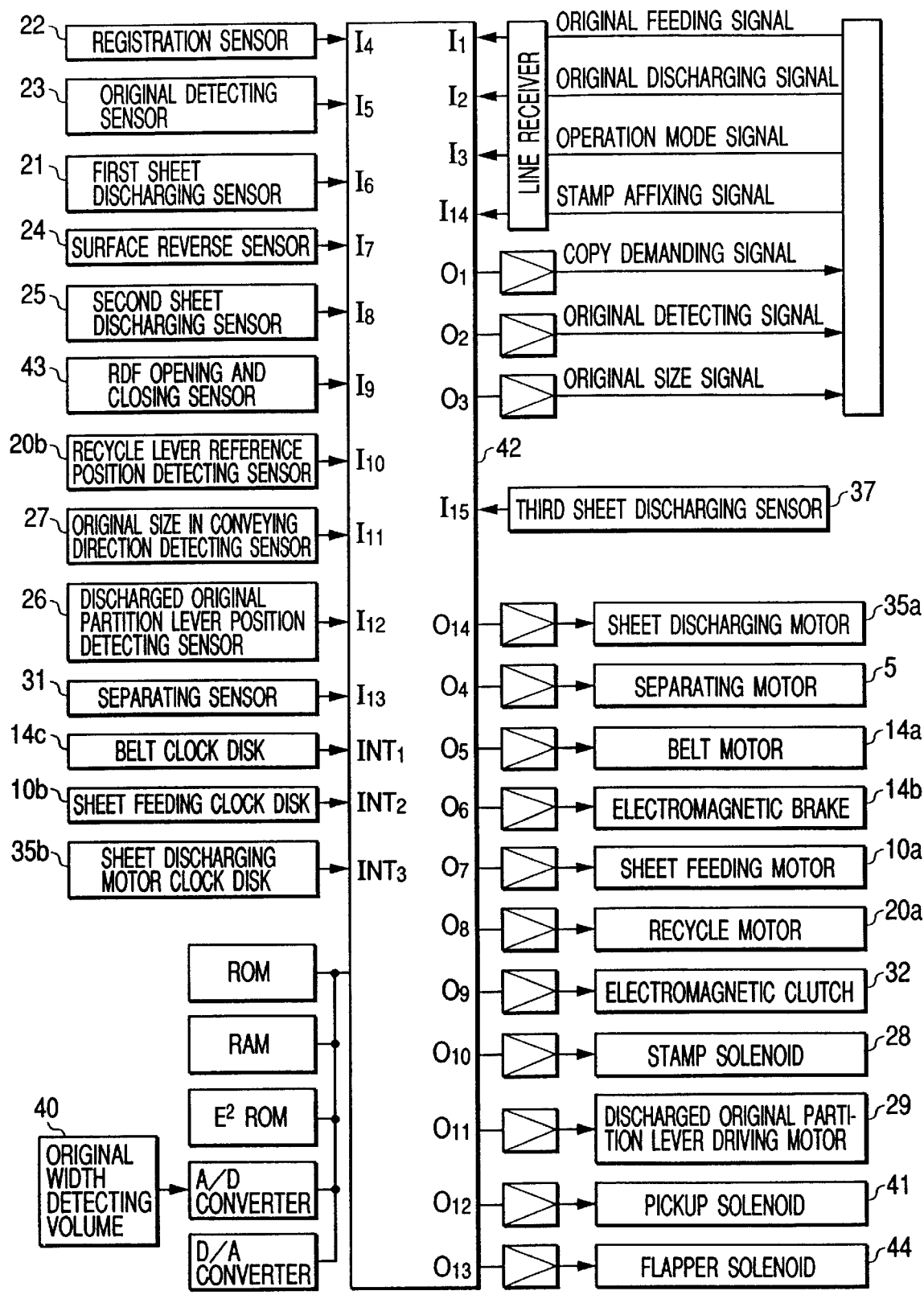
FIG. 2 is a circuit block diagram showing the automatic original feeding apparatus of FIG. 1.
Figure 9A:
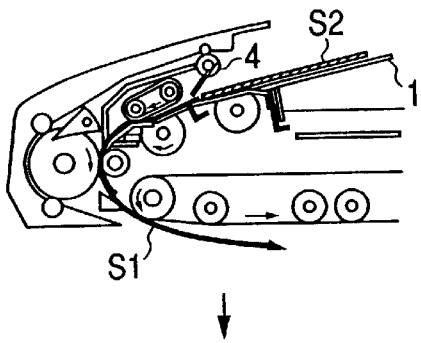
FIGS. 9A, 9B, 9C, 9D, 9E and 9F illustrate a mode operation of copying two originals on a sheet of copying paper by an upward separation.
Figure 9B:
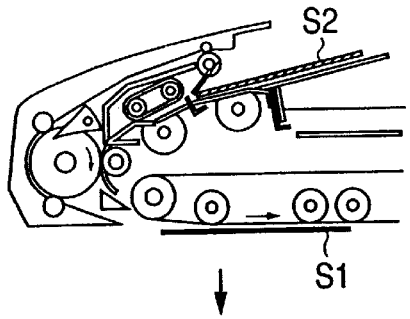
Figure 9C:
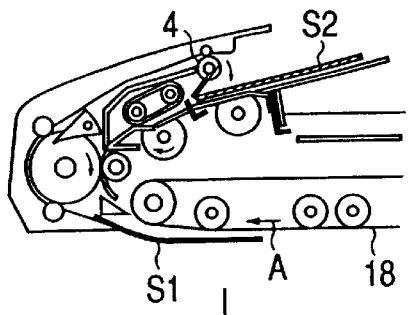
Figure 9D:
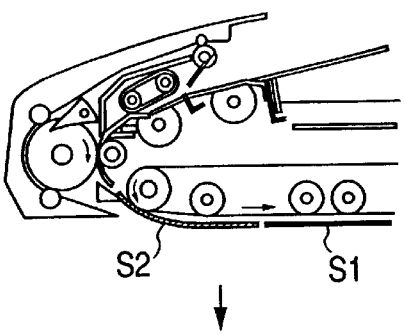
Figure 9E:
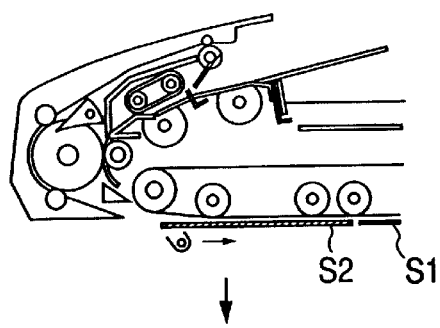
Figure 9F:
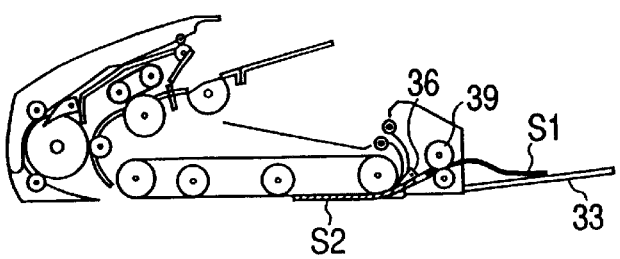
Figure 10:
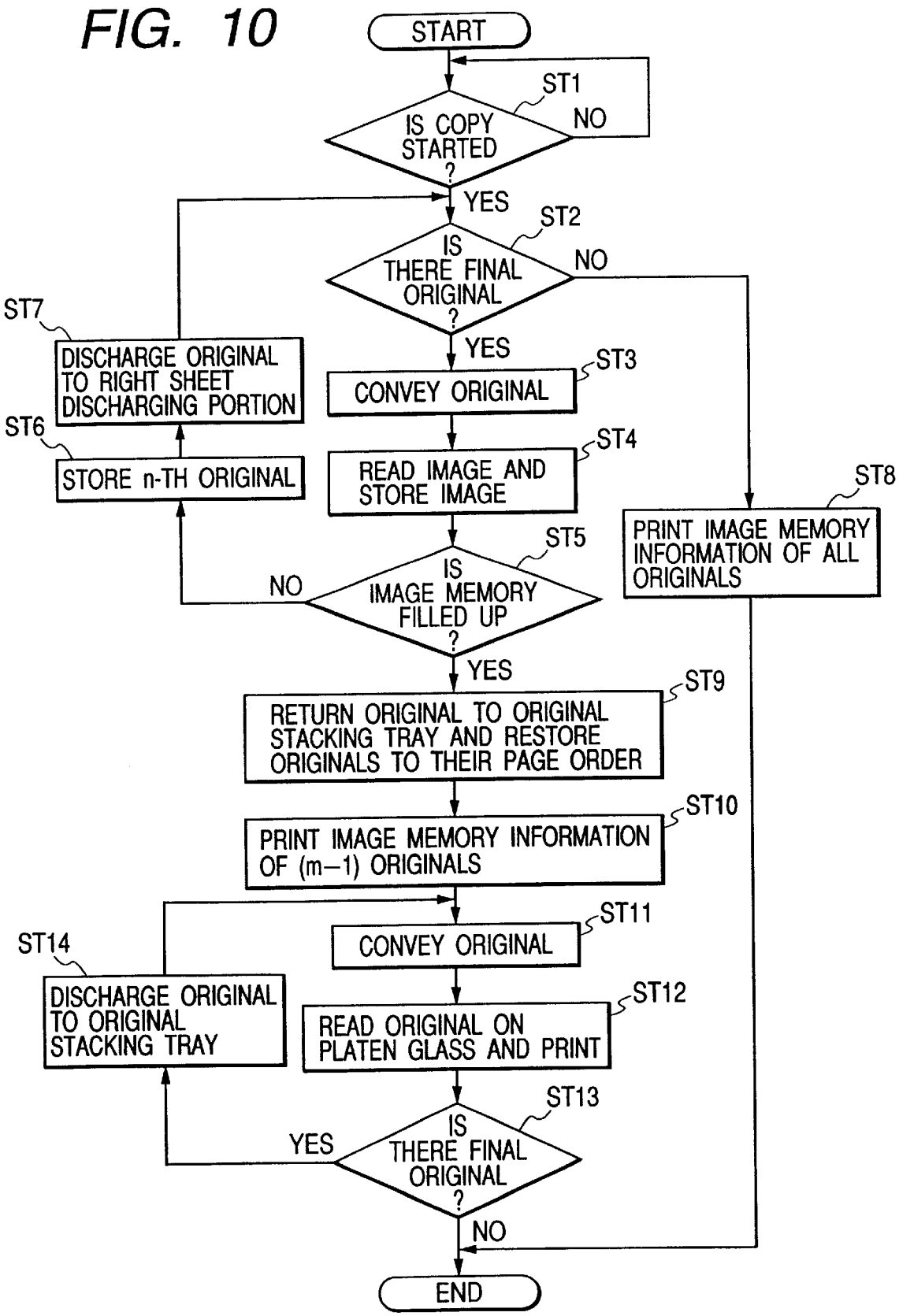
FIG. 10 is a flowchart illustrating a controlling operation of an automatic original feeding apparatus of the present invention.

FIG. 1 schematically shows a construction of an automatic original feeding apparatus of the present invention, FIG. 2 is a circuit block diagram showing the automatic original feeding apparatus of FIG. 1, FIGS. 3A to 3E through 9A to 9F illustrate an image reading operation of the automatic original feeding apparatus, and FIG. 10 is a flowchart illustrating a controlling operation of the automatic original feeding apparatus.

Referring to FIG. 1, an original stacking tray 1 as original stacking means on which originals S are stacked and set is downward inclined toward an original feeding-out direction so that the original feeding-out side thereof may become low. The reference numeral 2 designates an original stopper by which the originals S stacked on the original stacking tray 1 are stacked uniformly in the feeding-out direction.

On the original stacking tray 1, an original regulating plate (not shown) is provided widthwisely relative to the feeding-out direction of the originals S so that the original S may be brought into contact with the original regulating plate to thereby prevent the skew feeding of the original during the conveyance of the original.

Also, the original regulating plate has connected thereto an original width detecting volume 40 (see FIG. 2) of which the voltage value fluctuates in operative association with the position thereof. This original width detecting volume 40 outputs a voltage value conforming to the position of the original regulating plate and can thereby detect the widthwise size of the original.

On the original stacking tray 1, provision is made of an original detecting sensor 23 as original detecting means for detecting the presence or absence of the originals S, and an original size in conveying direction detecting sensor 27 for detecting whether the original can be placed on a platen glass 15 as an original reading portion.

The reference numeral 3 denotes a semicircular roller as a sheet feeding roller for separating the originals S on the original stacking tray 1 from the lower one (downward separation), and this semicircular roller 3 is rotated in a direction indicated by the arrow R3 in FIG. 1 to thereby feed out the original S to a downstream separating portion which will be described later. The semicircular roller 3 is controlled so as to be stopped with its cut-away portion facing upwardly when the originals S are absent on the original stacking tray 1 and when the original S is not fed out to the separating portion. The reference numeral 4 designates a pickup roller for separating and feeding the originals S on the original stacking tray 1 from the upper one (upward separation), and this pickup roller 4 is designed to be vertically pivotable so as to be moved toward and away from the originals S on the original stacking tray 1 by a pickup solenoid 41 (see FIG. 2).

The reference numeral 6 denotes a feeding roller which differs in the direction of rotation depending on whether the originals S on the original stacking tray 1 are downwardly separated or upwardly separated, and the reference numerals 7 and 8 designate separating rollers rotatable in the same direction of rotation as the feeding roller 6, and a separating belt 9 is passed over these separating rollers 7 and 8. The feeding roller 6 and the separating belt 9 passed over the separating rollers 7 and 8 together constitute a separating portion. The semicircular roller 3, the feeding roller 6 and the separating rollers 7 and 8 are driven by a separating motor 5.

The reference numeral 19 denotes a recycle lever driven by a recycle motor 20a so as to rest on the uppermost original S, and this recycle lever 19 rests on the uppermost original S to thereby distinguish between the last original and the copied original when the feeding of the originals S is started. Also, the recycle lever 19 is designed to be capable of counting the number of originals on the original stacking tray 1 until in the one-face original conveying operation, the copying operation is not performed, but the recycle lever 19 once placed on the bundle of originals conveys the last original from the original stacking tray 1.

That is, if in a mode wherein for example, the originals S on the original stacking tray 1 are downwardly separated and one-face originals are outputted to both surfaces of a sheet of paper or a mode wherein two sheets of originals (2 in 1) are outputted to a sheet of paper, whether the number of originals is an odd number or an even number is not known, the last sheet standard will be provided and the image position of the top page will come not to be decided and therefore, the number of originals is counted.

The recycle lever 19 has its position detected by a recycle lever reference position detecting sensor 20b.

The reference character 10a designates a sheet feeding motor for driving a feeding roller 11 and a feeding roller 12 urged against each other, and this sheet feeding motor 10a is rotated to rotate the feeding rollers 11 and 12 in the directions of arrows to thereby nip the original between the feeding roller 11 and the feeding roller 12 and convey it onto the platen glass 15. The sheet feeding motor 10a also drives a first discharging roller 13a and a second discharging roller 13b.

The length of the original in the direction of conveyance thereof can be detected by measuring the amount of pulse of a sheet feeding clock disk 10b while the original conveyed by the feeding rollers 11 and 12 passes a registration sensor 22, by a sheet feeding clock sensor 10c.

A whole surface belt 18 on the platen glass 15 is an endless belt having a length and a width covering the whole surface of the original, and the whole surface belt 18 is passed over a driving roller 16 and a turn roller 17. The whole surface belt 18 has a sufficient coefficient of friction to hold the original by the frictional force of the surface thereof and slide the original on the platen glass 15 to thereby convey it in both directions, and is designed such that the whole surface belt 18 and the driving roller 16 do not slip relative to each other.

The driving roller 16 is rotatively driven by a belt motor 14a. An electromagnetic brake 14b for stopping the rotation of the belt motor 14a and a belt clock disk 14c are mounted on a shaft of the belt motor 14a. The electromagnetic brake 14b stops the rotation of the belt motor 14a when the amount of pulse of the belt clock disk 14c is measured by a belt clock sensor 14d and the whole surface belt 18 has been turned by a predetermined distance.

The reference numeral 30 denotes a discharged original partition lever driven by a discharged original partition lever driving motor 29, and this discharged original partition lever 30 has its position detected by a discharged original partition lever position detecting sensor 26.

A sheet discharging motor 35a drives a pair of third discharging rollers 34 on the basis of a third sheet discharging sensor 37 and a pair of fourth discharging rollers 39 on the basis of a second sheet discharging sensor 25, and a sheet discharging motor clock disk 35b is mounted on a shaft of the sheet discharging motor 35a. The amount of pulse of this sheet discharging motor clock disk 35b is measured by a sheet discharging motor clock sensor 35c to thereby control the rotation of the pair of third discharging rollers 34 and the pair of fourth discharging rollers 39.

In FIG. 1, the reference numeral 36 designates a flapper for changing over whether the original S is to be discharged to a first original discharging tray 38 as discharging means or to be discharged to a second original discharging tray 33 as discharging means, and this flapper 36 performs the changing-over operation by a flapper solenoid 44.

The circuit block diagram of the RDF will now be described with reference to FIG. 2.

The RDF in the present invention is comprised chiefly of a one-chip microcomputer (hereinafter referred to as the microcomputer) 42 as control means, and further effects various kinds of control while exchanging signals with the controller of a digital copying apparatus as an image recording apparatus by communication.

Signals from a registration sensor 22, a first sheet discharging sensor 21, the surface reverse sensor 24, the second sheet discharging sensor 25, a separating sensor 31 and the third sheet discharging sensor 37 provided on the conveying path for the originals S toward the downstream side of the above-described original stacking tray 1 are inputted to the input ports I4, I6 to I8, I13 and I15, respectively, of the microcomputer 42, and signals from an original detecting sensor 23, an RDF opening-closing sensor 43, a recycle lever reference position detecting sensor 20b, an original size in conveying direction detecting sensor 27 and a discharged original partition lever position detecting sensor 26 provided on the original stacking tray 1, the original discharging trays 33, 38, etc. are inputted to the input ports I5 and I9 to I12, respectively, of the microcomputer 42.

Encoder pulse signals from a belt clock disk 14c, a sheet feeding clock disk 10b and a sheet discharging motor clock disk 35b are inputted to the interruption terminals INT1, INT2 and INT3, respectively, of the microcomputer 42. These become a reference clock for the amount of sheet feeding movement, and the counting operation is performed by a counter in the microcomputer 42.

On the other hand, the operation signals of a sheet discharging motor 35a, a separating motor 5, a belt motor 14a, an electromagnetic brake 14b, a sheet feeding motor 10a, a recycle motor 20a, an electromagnetic clutch 32, a stamp solenoid 28 for affixing an original reading completion stamp on the originals discharged from the platen glass 15, a discharged original partition lever driving motor 29, a pickup solenoid 41 and a flapper solenoid 44 are outputted to the output ports O14 and O4 to O13, respectively, of the microcomputer 42, and each output load is controlled through each driver.

Also, the exchange of signals with the controller of the copying apparatus is effected by communication, and an original feeding signal, an original discharging signal, an operation mode signal and a stamp affixing signal are inputted to the inputs I1 to I3 and I14, respectively, of the microcomputer 42, and a COPY demanding signal, an original detecting signal and an original size signal are outputted from the output ports O1 to O3, respectively, of the microcomputer 42.

Further, the microcomputer 42 has connected thereto a ROM in which a control program is contained, an image memory comprised of a RAM as image information storing means as a working area for calculation or the like, an EEROM which is a non-volatile memory, an A/D converter for reading a voltage value, and a D/A converter which is output voltage varying means.

The original width detecting volume 40 operating in operative association with the original regulating plate provided on the original stacking tray 1 is connected to the A/D converter, and by detecting the voltage value thereof, the width of the originals on the original stacking tray 1 can be detected.

Description will now be made of the downwardly separating and conveying operation for the originals by the RDF constructed as described above.

In the case of the downward separation and conveyance of the original S, the semicircular roller 3 is first rotated in the direction of arrow R3 to thereby feed the original S to the downstream separating portion. The feeding roller 6 is then rotated in the direction of arrow indicated in FIG. 3B or FIG. 4B to thereby further feed the original from the original stacking tray 1. At this time, the pickup solenoid 41 is operated on the basis of the instructions from the microcomputer 42, and the pickup roller 4 is not rotated but is lowered onto the bundle of originals, and presses the bundle of originals to thereby improve the drawing-out of the originals by the semicircular roller 3.

Further, of the originals conveyed by the semicircular roller 3, the lowermost original is separated by the feeding roller 6 and the separating belt 9.

When in the copying operation of the copying apparatus, the memory is not used (the memory cannot be used by FAX or the like), the original circulation of feeding an original from the original stacking tray 1 to the platen glass 15 and effecting image reading, and again returning the original to the original stacking tray 1 is made possible. The first discharging roller 13a is urged against the feeding roller 12, and by the movement of the whole surface belt 18 in the direction of arrow A, the original discharged from the platen glass 15 is nipped and conveyed between the feeding roller 12 and the first discharging roller 13a. Thereafter, the original is discharged from the second discharging roller 13b to the original stacking tray 1. Thereafter, this original circulating operation is repeated until the conveyance of the last original or the stoppage of the original conveying operation.

Also, as when in the conveying operation for a one-face original, the recycle lever 19 does not perform the copying operation but counts the number of originals, and in the copying apparatus, that information is detected to thereby take a both-face copy from the one-face originals, it becomes possible to effect image processing appropriately when an odd number of originals are to be image-processed.

When in the copying operation of the copying apparatus, the memory is used, it is unnecessary to circulate the original and therefore, by the movement of the whole surface belt 18 in the direction of arrow B, the original discharged from the platen glass 15 is conveyed to the pair of third discharging rollers 34 by changing over the flapper 36 and by the conveying path, and can be nipped between the pair of third discharging rollers 34 and discharged to the first original discharging tray 38. At this time, the flapper 36 is driven by the flapper solenoid 44 so that the conveying path as an original conveying path may be changed over to the first original discharging tray 38 side.

By the original being thus conveyed, the original conveyance driving portions such as the separating motor 5, the sheet feeding motor 10a and the belt motor 14a move only in one direction and therefore, the original movement distance is greatly shortened and the driving direction changeover time becomes unnecessary and therefore, the original interchanging time for reading the image is shortened.

Also, if a plurality of originals can be juxtaposed on the platen glass 15 after image reading has been terminated by the copying apparatus, the preceding original of which the image reading has been terminated is intactly moved in the direction of arrow B by the whole surface belt 18 and the succeeding original is fed to the platen glass 15 and juxtaposed with the preceding original on the platen glass 15. Thereby, the original interchanging time can be further shortened.

Description will now be made of the upward separating and conveying operation for the originals by the RDF.

In the upward separating and conveying operation for the originals, the recycle lever 19 does not drive because the original is not returned to the original stacking tray 1 and it is not necessary to distinguish between the last original and the copied original. The original size in conveying direction detecting sensor 27 detects whether the originals placed on the original stacking tray 1 can be placed on the platen glass 15.

First, the pickup solenoid 41 is operated and the pickup roller 4 is urged against the bundle of originals while being rotated, whereby the uppermost original is conveyed from the original stacking tray 1 to the separating portion.

In the separating portion, the separating motor 5 is rotated in a direction opposite to that during the aforedescribed downward separation and conveyance of the original to thereby reversely rotate the feeding roller 6 and the separating belt 9 and separate only the uppermost original.

The conveyance of the original from the separating portion to the platen glass 15 is similar to the above-described downward separating and conveying operation.

If a plurality of originals can be juxtaposed on the platen glass 15 after the reading of the originals has been terminated by the copying apparatus, the preceding original of which the image reading has been terminated earlier is intactly moved in the direction of arrow B by the whole surface belt 18 and the succeeding original is fed and juxtaposed on the platen glass 15 like the preceding original.

Also, if a plurality of originals cannot be juxtaposed on the platen glass 15, the preceding original is further moved in the direction of arrow B by the whole surface belt 18, and the flapper 36 is changed over and the preceding original discharged from the platen glass 15 is nipped between the pair of fourth discharging rollers 39 and is discharged onto the second original discharging tray 33, whereafter the next succeeding original is fed and placed on the platen glass 15.

At this time, the stamp solenoid 28 is driven on the basis of the command of the copying apparatus, whereby as the mark of the completion of image reading, a reading completion stamp is affixed on a predetermined location on the discharged preceding original. Thereafter, this operation is repeated until the conveyance of the last original or the stoppage of the original conveying operation.

In the upward separating and conveying operation for the originals, the processing is from the top page and therefore it is unnecessary to know the number of originals and thus, the operation of counting the number of originals is not performed.

Further, FIGS. 3A to 9F show the relation between the operation mode and the movement of the original.

The RDF performs the operation of conveying various kinds of originals on the basis of an operation mode signal by the sizes and number of copies of the various kinds of originals from the copying apparatus.

FIGS. 3A to 3E are illustrations showing the operation in a one-face original mode in which the originals are downwardly separated and circulated.

Figure 3A:
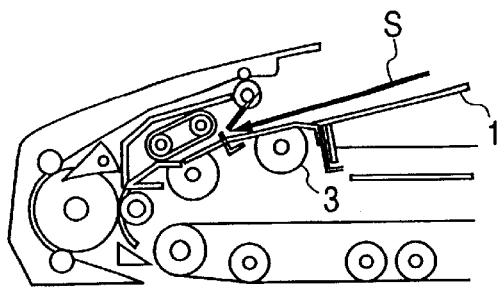
FIGS. 3A, 3B, 3C, 3D and 3E illustrate an image reading operation in a downward separating circulation of one-face original mode.
Figure 3B:
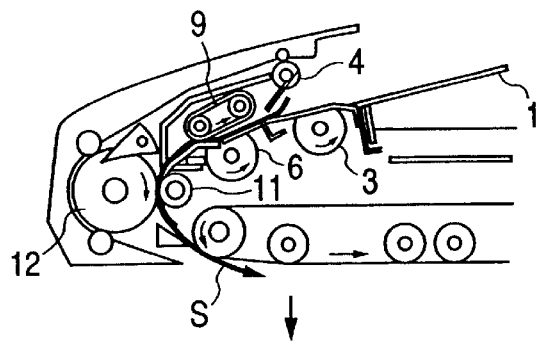
Figure 3C:
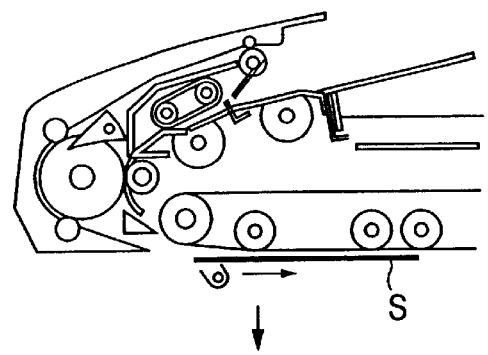
Figure 3D:
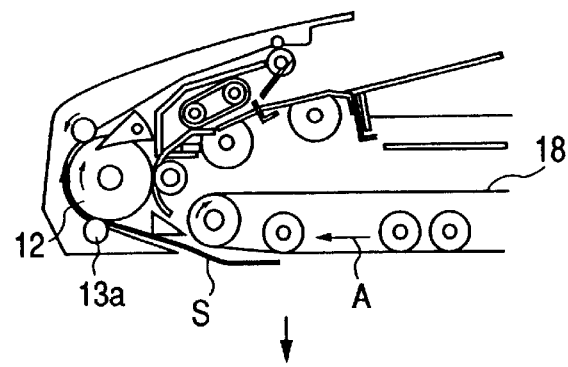
Figure 3E:
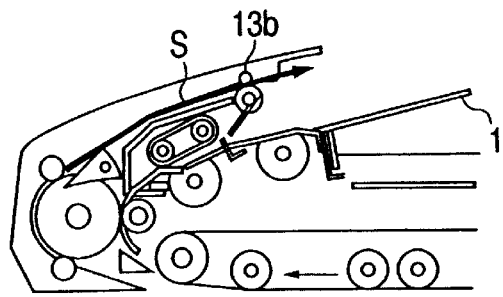

FIG. 3A shows the start of the feeding of the lowermost original S from the original stacking tray 1, FIG. 3B shows the feeding of the original S, FIG. 3C shows the completion of the placement of the original S onto the platen glass 15 and the image reading operation, FIG. 3D shows the start of the discharging of the original S from the platen glass 15, and FIG. 3E shows the discharging of the original S.

That is, when on the basis of the operation mode signal of a one-face original for downward separation and circulation from the copying apparatus, sheet feeding is started by the semicircular roller 3, the originals S on the original stacking tray 1 start to be fed in succession from the lowermost original (see FIG. 3A). The originals S are then separated into one sheet by the separating portion (see FIG. 3B), and the one original passes between the feeding rollers 11 and 12 and is set on the platen glass 15 by the movement of the whole surface belt 18 in the direction of arrow B. The original placed on the platen glass 15 has its image read by the copying apparatus (see FIG. 3C), and the whole surface belt 18 is moved in the direction of arrow A to thereby pass the original between the feeding roller 12 and the first discharging roller 13a (see FIG. 3D) and further discharge it from the second discharging roller 13b onto the original stacking tray 1 (see FIG. 3E).

FIGS. 4A to 4E are illustrations showing the operation in the one-face original mode in which the originals S are downwardly separated and non-circulated.

Figure 4A:
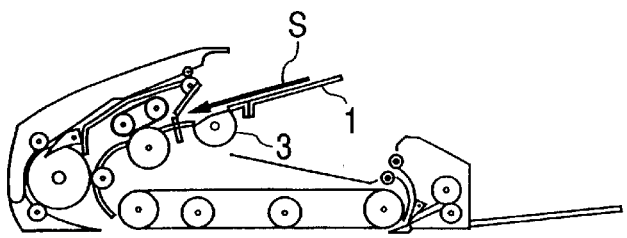
FIGS. 4A, 4B, 4C, 4D and 4E illustrate an image reading operation in a downward separating on-circulation of one-face original mode.
Figure 4B:
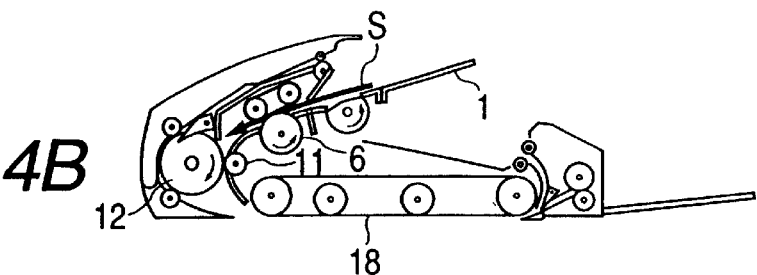
Figure 4C:
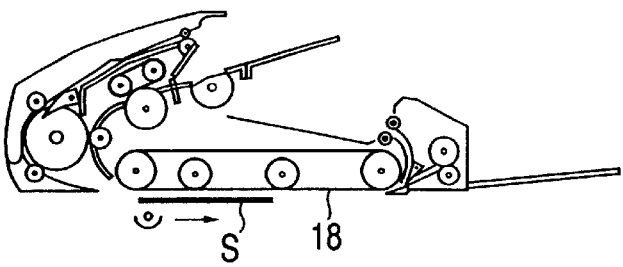
Figure 4D:
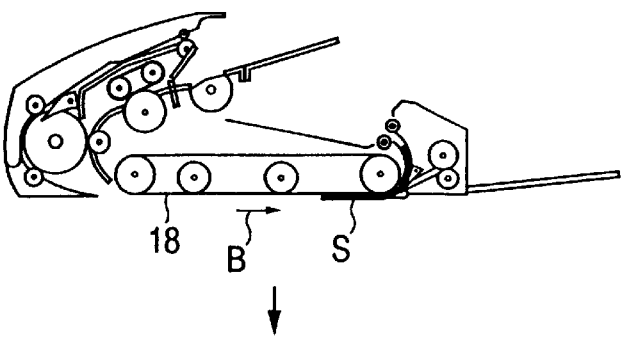
Figure 4E:
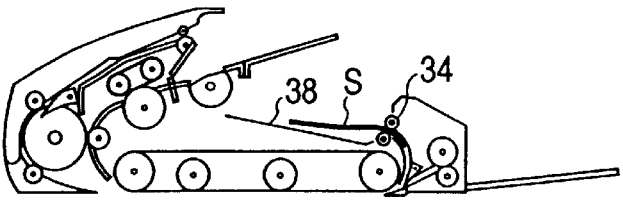

FIG. 4A shows the start of the feeding of the lowermost original S from the original stacking tray 1, FIG. 4B shows the feeding of the original S, FIG. 4C shows the completion of the placement of the original S onto the platen glass 15 and the image reading operation, FIG. 4D shows the start of the discharging of the original S from the platen glass 15, and FIG. 4E shows the discharging of the original S.

That is, when on the basis of the operation mode signal of a one-face original for downward separation and non-circulation from the copying apparatus, sheet feeding is started by the semicircular roller 3, the originals S on the original stacking tray 1 start to be fed in succession from the lowermost original (see FIG. 4A). The originals S are separated into one sheet by the separating portion (see FIG. 4B), and the one original passes between the feeding rollers 11 and 12 and is set on the platen glass 15 by the movement of the whole surface belt 18 in the direction of arrow B. The original S placed on the platen glass 15 has its image read by the copying apparatus (see FIG. 4C), whereafter the whole surface belt 18 is further moved in the direction of arrow B (see FIG. 4D) to thereby discharge the original S from the third discharging roller 34 onto the first original discharging tray 38 (see FIG. 4E).

FIGS. 5A to 5H are illustrations showing the operation in a both-face original mode in which the originals are downwardly separated.

Figure 5A:
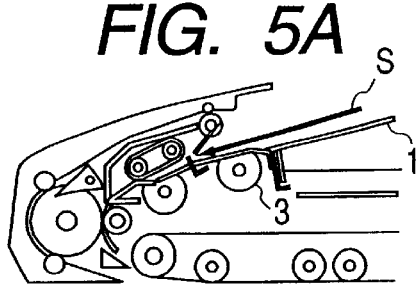
FIGS. 5A, 5B, 5C, 5D, 5E, 5F, 5G and 5H illustrate an image reading operation in a downward separation of both-face original mode.
Figure 5B:
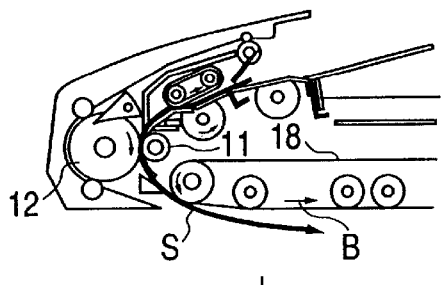
Figure 5C:
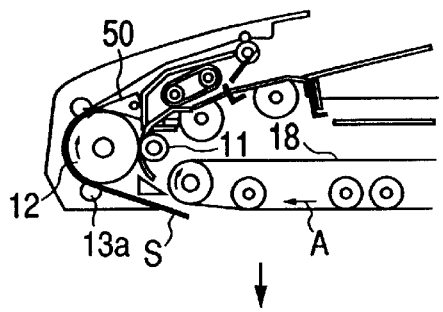
Figure 5D:
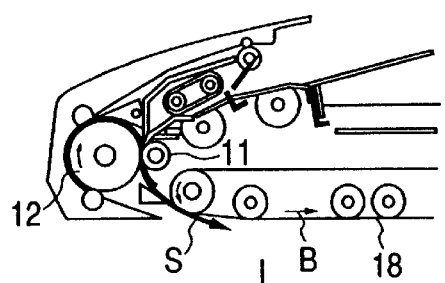
Figure 5E:
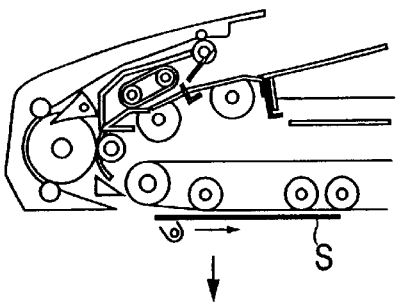
Figure 5F:
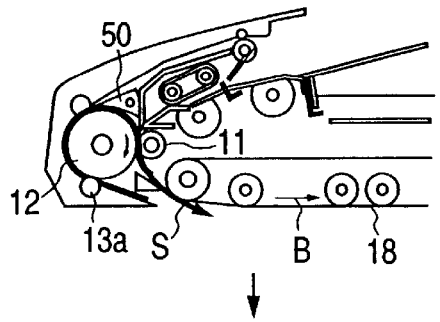
Figure 5G:
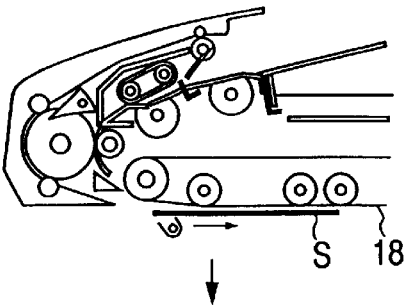
Figure 5H:
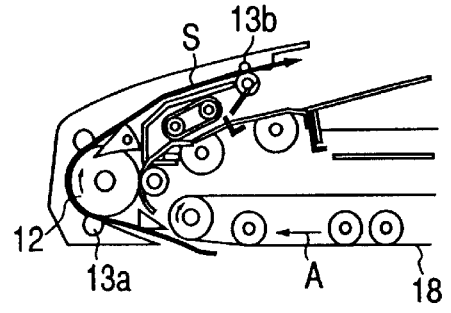

FIG. 5A shows the start of the feeding of the lowermost original S from the original stacking tray 1, FIG. 5B shows the feeding of the original S, FIG. 5C shows the start of the reversal in which the original S once conveyed onto the platen glass 15 is reversely fed, FIG. 5D shows the reversal resulting from the reverse feeding of the original S, FIG. 5E shows the completion of the placement of the back surface of the original S onto the platen glass 15 and the image reading operation, FIG. 5F shows the re-reversal resulting from the reverse feeding of the original S, FIG. 5G shows the completion of the placement of the front surface of the original S onto the platen glass 15 and the image reading operation, and FIG. 5H shows the discharging of the original S.

That is, when on the basis of the operation mode signal of a both-face original for downward separation from the copying apparatus, sheet feeding is started by the semicircular roller 3, the originals S on the original stacking tray 1 start to be fed in succession from the lowermost original (see FIG. 5A). The originals S are then separated into one sheet by the separating portion, and the one original passes between the feeding rollers 11 and 12 and is once placed on the platen glass 15 by the movement of the whole surface belt 18 in the direction of arrow B (see FIG. 5B). Thereafter, the whole surface belt 18 is moved in the direction of arrow A to reverse the original S, and the original S is directed from between the feeding roller 12 and the first discharging roller 13a to the flapper 50 (see FIG. SC), and is further directed from between the feeding roller 12 and the feeding roller 11 onto the platen glass 15 (see FIG. 5D). The rear surface of the original S is then set on the platen glass 15 by the movement of the whole surface belt 18 in the direction of arrow B, and the reading of the image thereof is effected by the copying apparatus (see FIG. 5E). Thereafter, the whole surface belt 18 is moved in the direction of arrow A to reverse the original again, and the original is directed from between the feeding roller 12 and the first discharging roller 13a to between the feeding rollers 11 and 12 by the flapper 50 (see FIG. 5F), and the whole surface belt 18 is further moved in the direction of arrow B to thereby set the original on the platen glass 15, and then the reading of the image thereof is effected by the copying apparatus (see FIG. 5G). The original of which the image has been read is directed from between the feeding roller 12 and the first discharging roller 13a to the second discharging roller 13b by the whole surface belt 18 being moved in the direction of arrow A (see FIG. 5H).

FIGS. 6A to 6G are illustrations showing the operation in the two in one mode in which the originals and downwardly separated and two originals are copied on a sheet of copying paper.

Figure 6A:
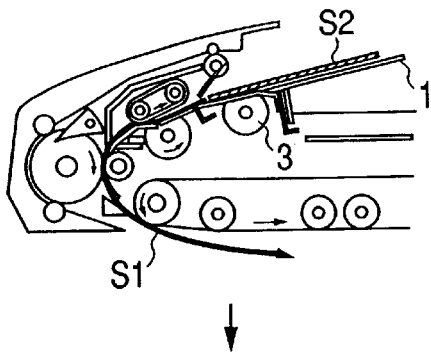
FIGS. 6A, 6B, 6C, 6D, 6E, 6F and 6G illustrate a mode operation of copying two originals on a sheet of copying paper by a downward separation.
Figure 6B:
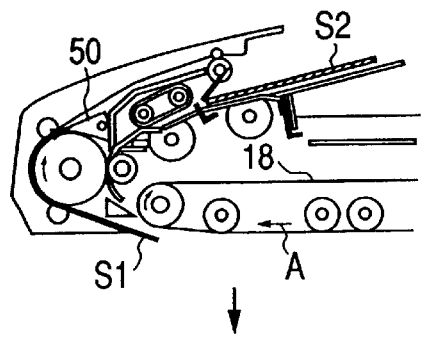
Figure 6C:
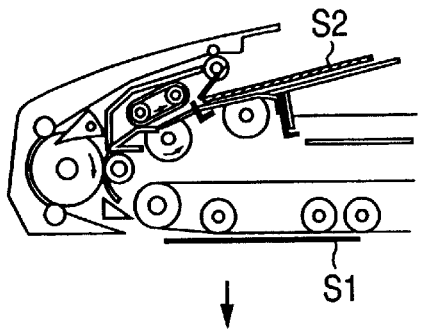
Figure 6D:
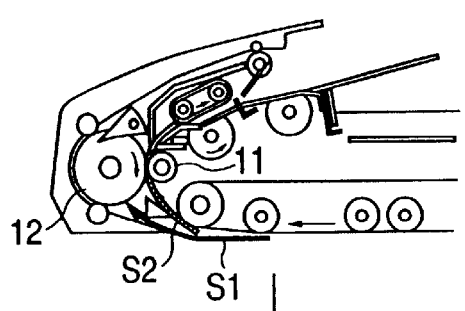
Figure 6E:
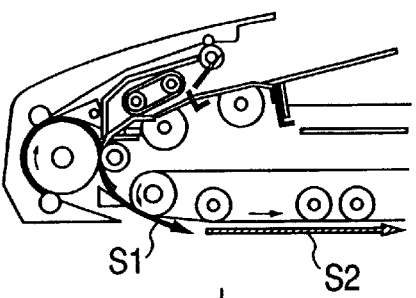
Figure 6F:
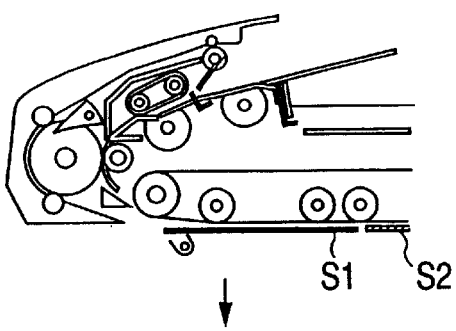
Figure 6G:
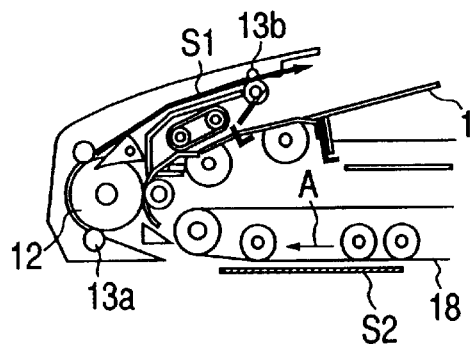

FIG. 6A shows the feeding of the lower original (the first original) S1 on the original stacking tray 1, FIG. 6B shows the first reversing operation of the first original S1, FIG. 6C shows the first reversing operation of the first original S1 and the start of the feeding of the upper original (the second original) S2, FIG. 6D shows the second reversing operation of the first original S1 and the feeding operation of the second original S2, FIG. 6E shows the feeding operation of the two originals onto the platen glass 15, FIG. 6F shows the completion of the feeding of the two originals S1 and S2 onto the platen glass 15 and the resulting image reading operation for copying the two originals on a sheet of copying paper, and FIG. 6G shows the discharging operation of the two originals S1, S2.

That is, when on the basis of the operation mode signal for downward separation and two in one from the copying apparatus, sheet feeding is started by the semicircular roller 3, the first original S1 on the original stacking tray 1 starts to be fed toward the platen glass 15 (see FIG. 6A). The first original S1 is then once placed on the platen glass 15, whereafter the whole surface belt 18 is moved in the direction of arrow A to thereby perform the first reversing operation (see FIG. 6B). When the first original S1 is reversed and placed on the platen glass 15, the feeding of the second original S2 is started (see FIG. 6C). Therewith, the first original S1 starts the second reversing operation and the second original passes between the feeding rollers 11 and 12 and is directed onto the platen glass 15 (see FIG. 6D). The second original S2 is then placed on the platen glass 15, whereafter the first original is reversed and placed on the platen glass 15 (see FIG. 6E). The two originals are then set on the platen glass 15, whereafter the images thereof are read by the copying apparatus (see FIG. 6F). The two originals S1 and S2 of which the images have been read, in succession from the first original S1, are fed between the feeding roller 12 and the first discharging roller 13a by the whole surface belt 18 being moved in the direction of arrow A, and then are discharged from the second discharging roller 13b onto the original stacking tray 1 (see FIG. 6G).

FIGS. 7A to 7E are illustrations showing the operation in the one-face original mode in which the originals are upwardly separated.

Figure 7A:
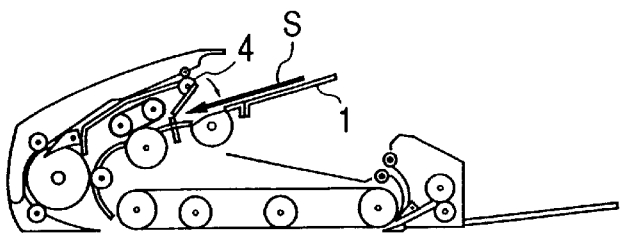
FIGS. 7A, 7B, 7C, 7D and 7E illustrate an image reading operation in an upward separation of one-face original mode.
Figure 7B:
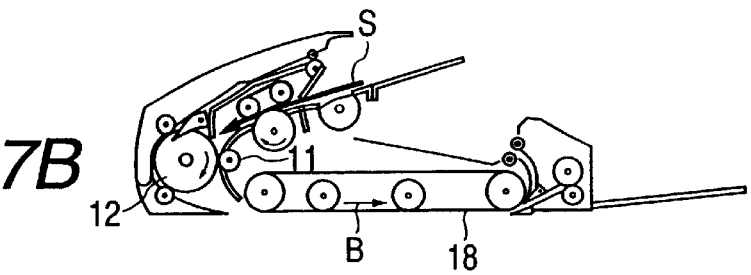
Figure 7C:
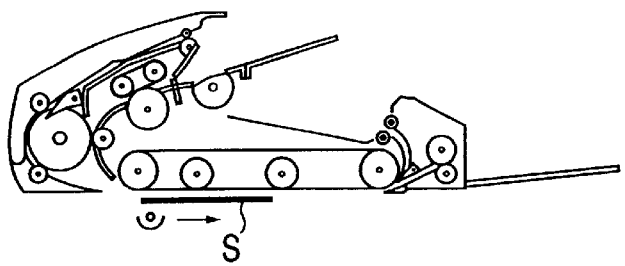
Figure 7D:
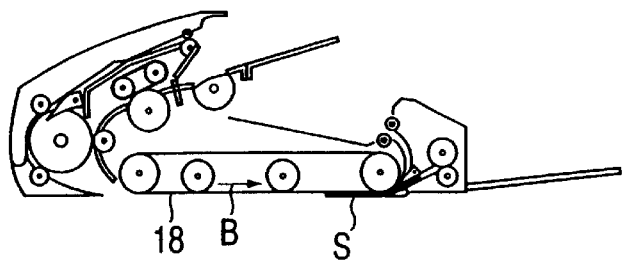
Figure 7E:
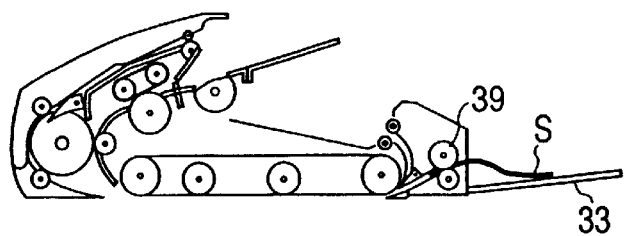

FIG. 7A shows the start of the feeding of the uppermost original S from the original stacking tray 1, FIG. 7B shows the feeding of the original S, FIG. 7C shows the completion of the placement of the original S onto the platen glass 15 and the image reading operation, FIG. 7D shows the start of the discharging of the original S from the platen glass 15, and FIG. 7E shows the discharging of the original S.

That is, when on the basis of the operation mode signal of a one-face original for upward separation and non-circulation from the copying apparatus, sheet feeding is started by the pickup roller 4, the originals S on the original stacking tray 1 start to be fed in succession from the uppermost original (the top page) (see FIG. 7A). The originals S are then separated into one sheet by the separating portion (see FIG. 7B), and passes between the feeding rollers 11 and 12 and is set on the platen glass 15 by the movement of the whole surface belt 18 in the direction of arrow B. The original S placed on the platen glass 15 has its image read by the copying apparatus (see FIG. 7C), whereafter the whole surface belt 18 is further moved in the direction of arrow B (see FIG. 7D), whereby the original S is discharged from the fourth discharging roller 39 onto the second original discharging tray 33 (see FIG. 7E).

FIGS. 8A to 8I are illustrations showing the operation in the both-face original mode in which the originals are upwardly separated.

Figure 8A:
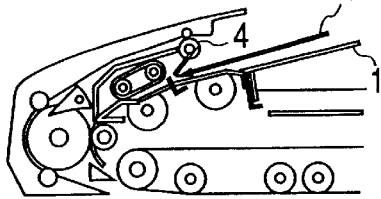
FIGS. 8A, 8B, 8C, 8D, 8E, 8F, 8G, 8H and 8I illustrate an image reading operation in a top separation of both-face original mode.
Figure 8B:
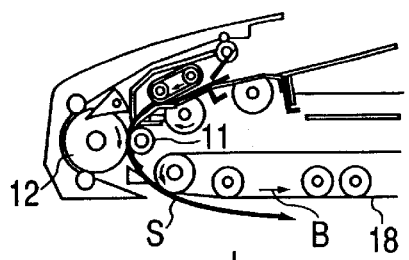
Figure 8C:
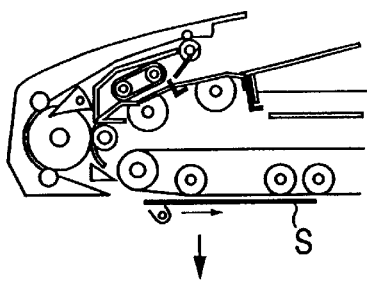
Figure 8D:
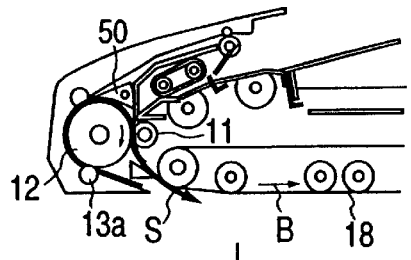
Figure 8E:
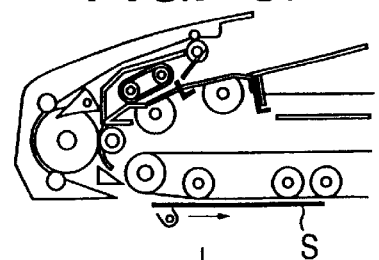
Figure 8F:
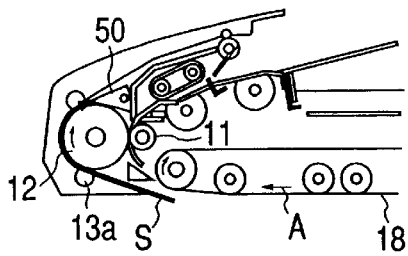
Figure 8G:
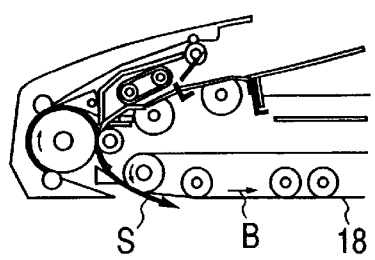
Figure 8H:
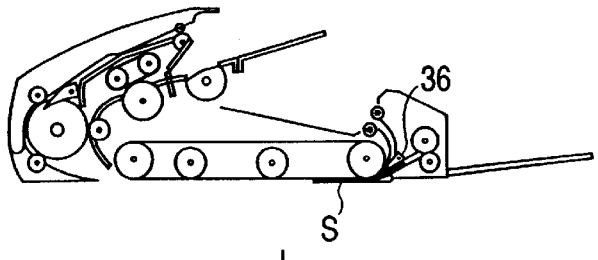
Figure 8I:
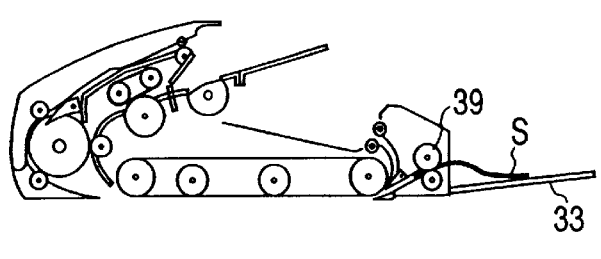

FIG. 8A shows the start of the feeding of the uppermost original S from the original stacking tray 1, FIG. 8B shows the feeding of the original S, FIG. 8C shows the placement of the original S on the platen glass 15 with the front surface (the first surface) thereof facing downward and the reading of the first surface of the original S, FIG. 8D shows the reversing operation resulting from the reverse feeding of the original S, FIG. 8E shows the completion of the placement of the original S on the platen glass 15 with the rear surface (the second surface) thereof facing downward and the image reading operation, FIG. 8F shows the start of the re-reversal resulting from the reverse feeding of the original S, FIG. 8G shows the re-reversal resulting from the reverse feeding of the original S, FIG. 8H shows the discharging operation of the re-reversed original S from the platen glass 15, and FIG. 8I shows the discharging of the original S.

That is, when on the basis of the operation mode signal for upward separation and a both-face original from the copying apparatus, sheet feeding is started by the pickup roller 4, the originals S on the original supporting tray 1 start to be fed in succession from the uppermost original (see FIG. 8A). The originals S are then separated into one sheet by the separating portion, and the one original is conveyed between the feeding rollers 11 and 12 (see FIG. 8B). Thereafter, the original S is set on the platen glass 15 by the movement of the whole surface belt 18 in the direction of arrow B with the first surface thereof facing downward, and the reading of the image of the front surface is effected by the copying apparatus (see FIG. 8C). After the completion of the image reading, the whole surface belt 18 is moved in the direction of arrow A to reverse the original S, and the original S is directed from between the feeding roller 12 and the first discharging roller 13a to the flapper 50, and is further directed from between the feeding roller 12 and the feeding roller 11 onto the platen glass 15 (see FIG. 8D). When the original S is then set on the platen glass 15 by the movement of the whole surface belt 18 in the direction of arrow B with the second surface thereof facing downward, the reading of the image of the rear surface is effected by the copying apparatus (see FIG. 8E). Thereafter, the whole surface belt 18 is moved in the direction of arrow A to reverse the original S again, whereby the original S is directed to between the feeding roller 12 and the first discharging roller 13a (see FIG. 8F), and is directed from between the feeding rollers 11 and 12 onto the platen glass 15 by the flapper 50 (see FIG. 8G). The whole surface belt 18 is then moved in the direction of arrow B to thereby pass the original S onto the platen glass 15 (see FIG. 8H). The original S having passed the platen glass 15 is discharged from between the pair of fourth discharging rollers 39 onto the second original discharging tray 33 by the changeover of the flapper 36.

FIGS. 9A to 9F are illustrations showing the operation in the two in one mode in which the originals are upwardly separated and two originals are copied on a sheet of copying paper.

FIG. 9A shows the feeding of the uppermost or first original S1, FIG. 9B shows the placement of the first original S1 onto the platen glass 15, FIG. 9C shows the feeding of the second original S2 after the first original S1 has been conveyed by a predetermined amount in the opposite direction and stopped, FIG. 9D shows the feeding of the two originals S1 and S2 onto the platen glass 15, FIG. 9E shows the completion of the feeding of the two originals S1 and S2 and the reading of the images thereof, and FIG. 9F shows the discharging of the two originals S1 and S2.

That is, unlike during the downward separation, the originals are fed by the pickup roller 4 in succession from the uppermost (top page) original S1 on the original stacking tray 1 (see FIG. 9A), and the first original is once placed on the platen glass 15 (see FIG. 9B). Then, the whole surface belt 18 is moved in the direction of arrow A to thereby convey the first original S1 by a predetermined amount in the opposite direction and stop it, whereafter the second original S2 is fed by the pickup roller 4 and is made to stand by at a predetermined position (see FIG. 9C). The gap between the trailing end of the first original S1 and the leading end of the second original S2 is then eliminated, whereafter the first original S1 and the second original S2 are conveyed at a time and set on the platen glass 15 (see FIG. 9D). Thereafter, the images of these originals are read by the copying apparatus (see FIG. 9E), and then the two originals S1 and S2 are discharged from between the pair of fourth discharging rollers 39 onto the second original discharging tray 33 by the changeover of the flapper 36 (see FIG. 9F).

FIG. 10 is a flow chart illustrating the operation of the copying system of the present invention.

The RDF detects the copying started state of the copying apparatus (ST1), and performs the aforedescribed downwardly separated one-face original conveying operation if the mode is the downward separation one-face original mode.

That is, it detects by the original detecting sensor 23 whether there is any original on the original stacking tray 1 (ST2), conveys an original onto the platen glass 15 (ST3), and reads the image of the original to store image information in the image memory (ST4).

At this time, it checks up whether the read image information can be stored in the image memory (ST5), and if there is still an empty capacity in the image memory, it stores the just read image information with the information about how manieth original has been read (ST6), whereafter it discharges that original onto the first original discharging tray 38 (ST7).

Thereafter, it detects again by the original detecting sensor 23 whether there is any original on the original stacking tray 1, and if there is an original on the original stacking tray 1 and the feeding of the final original is not completed (ST2), it conveys the next original onto the platen glass 15 (ST3) and effects the reading of the image thereof (ST4).

In such a manner, it effects the reading of the image from the original, and when the original has become exhausted on the original stacking tray 1 (ST2), it prints the image information stored in the image memory (ST8).

Now, when the image memory has become full during the reading of the m-th original (ST5), it discontinues the storage of the image information into the image memory from that point of time, and returns the original on the platen glass 15 to the original stacking tray 1, and also returns further remaining originals being fed from the original stacking tray 1 onto the original stacking tray 1 so as to restore the order of pages to the initial order without reading the images thereof (ST9).

Next, the copying apparatus enters its printing state, and prints up to the (m-1)th original on the basis of the image memory information (ST10).

Thereafter, the originals are conveyed one by one from the original stacking tray 1 onto the platen glass 15 (ST11), and the reading and printing of the images thereof are effected (ST12), whereafter the originals are discharged onto the original stacking tray 1 (ST14). This operation is repeated, and is effected up to the final original (ST13).

As described above, the automatic original feeding apparatus is controlled as follows:

(1) The lowermost original placed on the original stacking tray 1 is fed and conveyed, and the original placed on the platen glass 15 is read, and when the storage capacity of the image memory is not full, image information is stored in the memory, and the read original is discharged onto the first sheet discharging tray 38.

(2) When the image memory has become full, the original on the platen glass 15 is discharged onto the original stacking tray 1 and the unprocessed originals remaining on the original stacking tray 1 are once conveyed one after another onto the platen glass 15 without the images thereof being read and the number of the unprocessed originals is counted, whereafter they are idly fed onto the original stacking tray 1.

(3) When all originals are stored in the image memory, they are printed out by the image information on the image memory.

(4) When all originals are not stored in the image memory, they are printed out based on the image information on the image memory, whereafter the originals on the automatic original feeding apparatus are conveyed onto the platen glass 15, and the originals are read and continuedly printed out.

By providing the above-described means, it becomes possible to shorten the print-out time.

EXAMPLE 1

Figure 11:
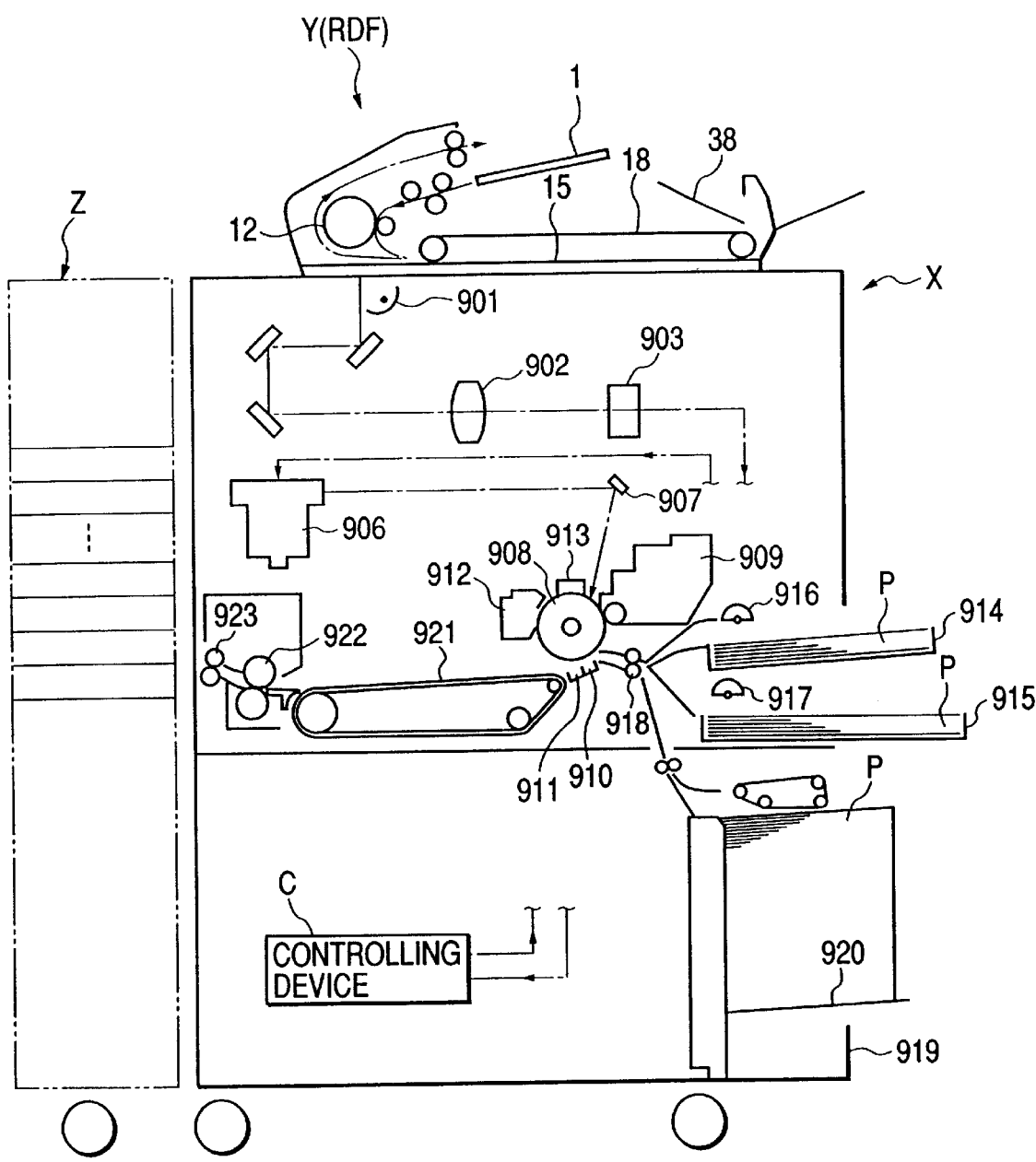
FIG. 11 is a front cross-sectional view showing a recording apparatus according to the present invention.

Specific examples will hereinafter be described with reference to FIG. 11. First, Example 1 is an example of a case where thirty (30) sheets of originals are copied by k sheets (k being a plurality) each, and description will be made of a case where these originals are successively read and the image memory (RAM) becomes full at a point of time whereat twenty-five (25) sheets have been read.

The copying started state is detected by the microcomputer 42 or the like of the control device C (ST1). When thereby, the presence of the originals on the original stacking tray 1 is detected through the original detecting sensor 23 (ST2), each driving portion of the RDF is controlled to thereby feed the originals on the original stacking tray 1 in succession from the lowermost original and convey them onto the platen glass 15 (ST3). In synchronism therewith, a light source 901, a lens system 902, etc. are controlled as shown in FIG. 11, and images are successively read from the originals (from the 30th page) successively conveyed onto the platen glass 15, and the image information is sequentially transmitted to the microcomputer 42 through a light receiving element 903 (ST4).

The microcomputer 42 judges that there is an empty capacity in the image memory (RAM) (ST5), and the read image information is sequentially stored in the image memory. Also, the microcomputer 42 controls the RDF and the originals which have been read are successively (from the 30th page to the 6th page) discharged onto the first original discharging tray 38 (ST7).

The steps ST2 to ST7 are repeated as described above and the image information of the 26th original is transmitted to the microcomputer 42 (ST4), whereupon the microcomputer 42 judges that there is no empty capacity in the image memory (RAM) (ST5), and stops the storage of the image information into the image memory and also controls the RDF to thereby return the 26th original on the platen glass 15 onto the original stacking tray 1, and the 27th to 30th originals (the 4th page to 1st page) which are about to be further fed from the original stacking tray 1 are also once successively conveyed to the platen glass 15 without the images thereof being read, and are again returned onto the original stacking tray 1 so as to restore the order of pages (the 1st page to the 5th page) to the initial order (ST9).

Next, the microcomputer 42 enters a printing state and effects the printing regarding the 1st to 25th originals (the 30th to 6th pages) stored in the image memory (ST10). That is, by the control by the microcomputer 42, the image information stored in the image memory is sequentially taken out, and on the basis of the image information, a laser beam is sequentially applied from a laser modulator 906. In the case of the present example, k sheets of print is effected for an original and therefore, the application of the laser beam based on the image information is done k times. The laser beam is applied to a photosensitive drum 908 driving-controlled in synchronism with the application of this laser beam, through an image writing-in optical system 907, and toner images are successively formed by a developing device 909 or the like. Simultaneously therewith, sheet materials P are successively fed from a cassette 914 or 915 or a deck 920 by the control by the microcomputer 42, as shown in FIG. 11. A toner image on the photosensitive drum 908 is transferred to the successively fed sheet materials P, and the sheet materials P to which the image transfer has been completed are successively conveyed to a fixating device 922 by a conveying device 921, whereby the fixation of the toner image is effected, and the sheet materials P are discharged by a pair of discharging rollers 923 and are successively stacked on a sorter Z (in this case, are distributed on a bin tray of k stages). The 30th page to the 6th page are contained in a bin in succession from the lowermost sheet material.

When in such a manner, the printing of the kth copy for the 25th original (the 6th page) is completed, the 26th to 30th original (the 5th page to the 1st page) are successively conveyed one by one from the original stacking tray 1 onto the platen glass 15 by controlling the RDF (ST11), and the reading and printing of the images are effected (ST12), whereafter the originals are discharged onto the original stacking tray 1 (or the tray 38) (ST14). In this case, printing is effected without the image information being stored in the image memory and therefore, the step ST14 is executed k times. That is, each original is read k times and k print sheets are discharged and distributed onto the bin tray. By the printing of the kth copy of the 30th original being thus completed, all prints are completed (ST13).

Thus, in the present example, the print-out time could be shortened as compared with the conventional apparatus.

When in the case of the printing of the k copies, the sorter is absent, printing can be done so that the sheets may be successively stacked for each bundle on the sheet discharging tray in such a manner as the 30th page—1st page, the 30th page—1st page, and so on, and the sheets can be discharged. In this case, with regard to five originals which cannot be memorized, they are circulated five times, and each time they are circulated, printing is effected in the order of pages.

EXAMPLE 2

Example 2 will now be described. Example 2 is an example of a case where 30 originals are copied one by one, and description will be made of a case where these originals are successively read and at a point of time whereat 25 sheets have been read, the image memory (RAM) becomes full.

In this example, the steps ST1 to ST9 of FIG. 10 regarding the reading, etc. of the originals were executed entirely similarly to Example 1.

At the step ST10, the microcomputer 42 enters the printing state, and effects the printing regarding the 1st to 25th originals stored by the image memory (ST10). That is, the image information stored in the image memory is sequentially taken out by the control by the microcomputer 42, and on the basis of the image information, a laser beam is sequentially applied from the laser modulator 906. In the case of the present example, a sheet of print is effected for an original and therefore, the application of the laser beam based on each image information is effected once. The laser beam is sequentially applied to the photosensitive drum 908 driving-controlled in synchronism with this application of the laser beam, and toner images are successively formed by the developing device 909, etc. Simultaneously therewith, sheet materials P are successively fed from the cassette 914 or 915 or the deck 920 as shown in FIG. 11 and therefore, the toner images on the photosensitive drum 908 are successively transferred to these sheet materials P, and the sheet materials P to which the transfer of the toner images has been completed are successively conveyed to the fixing device 922 by the conveying device 921, whereby the fixation of the toner images is effected, and the sheet materials P are discharged by the pair of discharging rollers 923 and are successively stacked on the non-sort bin of the sorter Z or an ordinary sheet discharging tray.

After the printing for the 25th original is completed in this manner, the RDF is controlled to thereby successively convey the 26th to 30th originals one by one from the original stacking tray 1 onto the platen glass 15 (ST11), and printing is effected without the images being read and stored in the image memory (ST12), whereafter the originals are discharged onto the original stacking tray 1 (ST14). The printed sheets are likewise successively stacked on the non-sort bin or the sheet discharging tray. In the present example, each of these steps ST11 to ST14 is executed once and therefore, the originals which have been read may be successively discharged onto the first original discharging tray 38. By the printing for the 30th original being thus completed, all prints are completed (ST13).

Thus, again in this Example 2, the print-out time could be shortened as compared with the conventional apparatus.

What is claimed is:

1. An image recording apparatus comprising:

stacking means for stacking originals thereon;

feeding means for feeding the originals on said stacking means one by one;

reading means for reading the information of the originals fed by said feeding means;

storing means for storing said read information therein;

image forming means for forming an image on a sheet based on said read information;

control means for controlling said reading means to read information of all originals stacked on said stacking means, and for controlling said storing means to store the information, and for thereafter controlling said image forming means to form images on sheets based on the stored information of said storing means;

first discharging means for discharging the originals from said reading means; and second discharging means disposed at a different place from said first discharging means for discharging the originals from said reading means, wherein in case that said storing means does not have room for storing information of originals before the information of all originals stacked on said stacking means is stored in said storing means, said control means controls said image forming means to form images on sheets based on the stored information, and thereafter controls said image forming means to form an image each time information of a remaining original is read by said reading means.

2. An image recording apparatus according to claim 1, wherein said first discharging means discharges the originals to said stacking means, and said second discharging means discharges the originals to other means than said stacking means.

3. An image recording apparatus according to claim 2, wherein the originals read and stored by said reading means are discharged by said second discharging means, and the originals not stored are discharged to said stacking means by said first discharging means.

4. An image recording apparatus according to claim 3, wherein said control means calls out the information of said stored originals and forms images on the sheets, and feeds the originals returned to said stacking means one by one and reads them and forms images.

5. An image recording apparatus according to claim 4, wherein the image formation based on a storage of said storing means is effected, and subsequently the feeding, reading and image information of the remaining originals are effected.

6. An image recording apparatus according to claim 5, wherein when the storage capacity is filled during a reading of an original, the reading of the original is discontinued and the original is returned to said stacking means, and the originals left on said stacking means are idly fed and again returned to said stacking means.

7. An image recording apparatus according to claim 6, wherein said stacking means is a tray, said feeding means has separating and feeding means for separating the originals on the tray one by one, and a reversible conveying belt for feeding the originals on a platen, said first discharging means has an upwardly curved path for directing the originals discharged from the platen to said tray by the reverse rotation of the belt, and said second discharging means has means for directing the originals discharged from the platen to a second tray by the forward rotation of the belt.

8. An image recording apparatus according to claim 7, wherein said control means controls so that a lowermost one of the originals stacked on said original stacking tray is fed and the image thereof is read, and when the storage capacity is not full, the image information is stored by said storing means and the read original is discharged onto said second tray, and controls so that when the storage capacity of said storing means has become full and the storage of the image information read by said reading means is impossible, unprocessed originals are once conveyed to said reading means and a number of the unprocessed originals are counted, whereafter the unprocessed originals are discharged onto said tray, whereafter the image recording of the image information stored in said storing means is effected and further, the unprocessed originals on said tray are read one by one in said reading means and the images thereof are recorded.

9. An image forming apparatus comprising:

a stacking tray for stacking originals;

feeding rollers for feeding an original from said stacking tray;

a light receiving element for reading an image of the original fed by said feeding rollers;

an image memory for storing information of the image read by said light receiving element;

a laser modulator for applying a laser beam to a photosensitive drum based on the information read by said light receiving element;

a microcomputer for controlling said light receiving element to read information of all originals stacked on said stacking tray, and for controlling said memory to store the information, and for thereafter controlling an application of laser beam of said laser modulator based on the information stored in said image memory;

first discharging means for discharging the originals from said image forming apparatus; and second discharging means disposed at a different place from said first discharging means for discharging the originals from said image forming apparatus, wherein in case that said image memory does not have room for storing information of originals before the information of all originals stacked on said stacking tray is stored in said image memory, said microcomputer controls an application of laser beam of said laser modulator based on the stored information, and thereafter controls an application of the laser beam of said laser modulator each time information of a remaining original is read by said light receiving element.

10. An image forming apparatus comprising:

a stacking tray for stacking originals;

feeding rollers for feeding an original from said stacking tray;

a light receiving element for reading an image of the original fed by said feeding rollers;

an image memory for storing information of the image read by said light receiving element;

image forming means for forming an image of a sheet based on the information read by said light receiving element;

a microcomputer for controlling said light receiving element to read information of all originals stacked on said stacking tray, and for controlling said memory to store the information, and for thereafter controlling said image forming means to form images on sheets based on the information stored in said image memory;

first discharging means for discharging the originals from said image forming apparatus; and second discharging means disposed at a different place from said first discharging means for discharging the originals from said image forming apparatus, wherein in case that said image memory does not have room for storing information of originals before the information of all originals stacked on said stacking tray is stored in said image memory, said microcomputer controls said image forming means to form images on sheets based on the stored information, and thereafter controls said image forming means to form an image on a sheet each time information of a remaining original is read by said light receiving element.

* * * * *

UNITED STATES PATENT AND TRADEMARK OFFICE
CERTIFICATE OF CORRECTION

PATENT NO.    : 6,587,220 B1
DATED         : July 1, 2003
INVENTOR(S)   : Shunji Sato et al.

It is certified that error appears in the above-identified patent and that said Letters Patent is hereby corrected as shown below:

Column 2,
Line 39, "on-circulation" should read -- non-circulation --.

Column 9,
Line 10, "FIG. SC)," should read -- FIG. 5C), --.

Signed and Sealed this

Second Day of December, 2003

JAMES E. ROGAN
*Director of the United States Patent and Trademark Office*